United States Patent
Takahashi et al.

(10) Patent No.: US 11,937,335 B2
(45) Date of Patent: Mar. 19, 2024

(54) USER EQUIPMENT, BASE STATION, AND SIGNAL TRANSMISSION METHOD

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 76 days.

(21) Appl. No.: 16/301,657

(22) PCT Filed: May 9, 2017

(86) PCT No.: PCT/JP2017/017483
§ 371 (c)(1),
(2) Date: Nov. 14, 2018

(87) PCT Pub. No.: WO2017/199789
PCT Pub. Date: Nov. 23, 2017

(65) Prior Publication Data
US 2019/0306917 A1    Oct. 3, 2019

(30) Foreign Application Priority Data

May 20, 2016  (JP) ................................. 2016-101953
May 26, 2016  (JP) ................................. 2016-105567

(51) Int. Cl.
*H04W 76/30*  (2018.01)
*H04W 28/02*  (2009.01)
(Continued)

(52) U.S. Cl.
CPC ....... *H04W 76/30* (2018.02); *H04W 28/0278* (2013.01); *H04W 72/12* (2013.01);
(Continued)

(58) Field of Classification Search
CPC . H04W 24/10; H04W 76/18; H04W 74/0833; H04W 76/28; Y02D 70/24
See application file for complete search history.

(56) References Cited

U.S. PATENT DOCUMENTS

2011/0249575 A1   10/2011   Dwyer et al.
2017/0150512 A1*   5/2017   Cao ................... H04W 72/1205
(Continued)

FOREIGN PATENT DOCUMENTS

JP   2013-219674 A   10/2013
JP   2014-143752 A    8/2014

OTHER PUBLICATIONS

International Search Report issued in PCT/JP2017/017483 dated Aug. 1, 2017 (5 pages).
(Continued)

*Primary Examiner* — Jung H Park
(74) *Attorney, Agent, or Firm* — Osha Bergman Watanabe & Burton LLP

(57) ABSTRACT

An user equipment in a wireless communication system including a base station and the user equipment is configured to include: a reception unit configured to receive information for setting a value of a predetermined timer from the base station; and a transmission unit configured to transmit an uplink data in a case where the predetermined timer is not activated, wherein the transmission unit activates the predetermined timer in a case where that the value of the predetermined timer is set from the base station and information indicating that there is no uplink data to be transmitted is transmitted to the base station.

4 Claims, 15 Drawing Sheets

(51) Int. Cl.
  *H04W 72/12* (2023.01)
  *H04W 76/20* (2018.01)
  *H04W 76/27* (2018.01)
  *H04W 80/02* (2009.01)
  *H04W 88/02* (2009.01)
  *H04W 88/08* (2009.01)

(52) U.S. Cl.
  CPC .......... *H04W 76/20* (2018.02); *H04W 76/27* (2018.02); *H04W 80/02* (2013.01); *H04W 88/02* (2013.01); *H04W 88/08* (2013.01)

(56) References Cited

U.S. PATENT DOCUMENTS

| | | | | |
|---|---|---|---|---|
| 2017/0311113 | A1* | 10/2017 | Abraham | H04W 4/70 |
| 2018/0288794 | A1* | 10/2018 | Wang | H04L 1/18 |
| 2019/0045349 | A1* | 2/2019 | Kim | H04W 76/20 |
| 2020/0267800 | A1* | 8/2020 | Kim | H04W 76/38 |

OTHER PUBLICATIONS

Written Opinion of the International Searching Authority issued in PCT/JP2017/017483 dated Aug. 1, 2017 (6 pages).

Ericsson et al.; "Release assistance indication in MAC"; 3GPP TSG-RAN2 Meeting #94, R2-164311; Nanjing, China; May 23-27, 2016 (4 pages).

3GPP TS 36.300 V13.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Sep. 2015 (254 pages).

3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).

Qualcomm Incorporated; "New Work Item: NarrowBand IOt (NB-IOT)"; 3GPP TSG RAN Meeting #69, RP-151621; Phoenix, USA; Sep. 14-16, 2015 (9 pages).

3GPP TS 36.331 V13.1.0; "3rd Generation Partnership Project; Technical Specification Group Radio Access Network; Evolved Universal Terrestrial Radio Access (E-UTRA); Radio Resource Control (RRC) Protocol specification (Release 13)"; Mar. 2016 (551 pages).

3GPP TS 36.321 V13.1.0; "3rd Generation Partnership Project; Technical Specification Group Radio Access Network; Evolved Universal Terrestrial Radio Access (E-UTRA); Medium Access Control (MAC) protocol specification (Release 13)"; Mar. 2016 (85 pages).

* cited by examiner

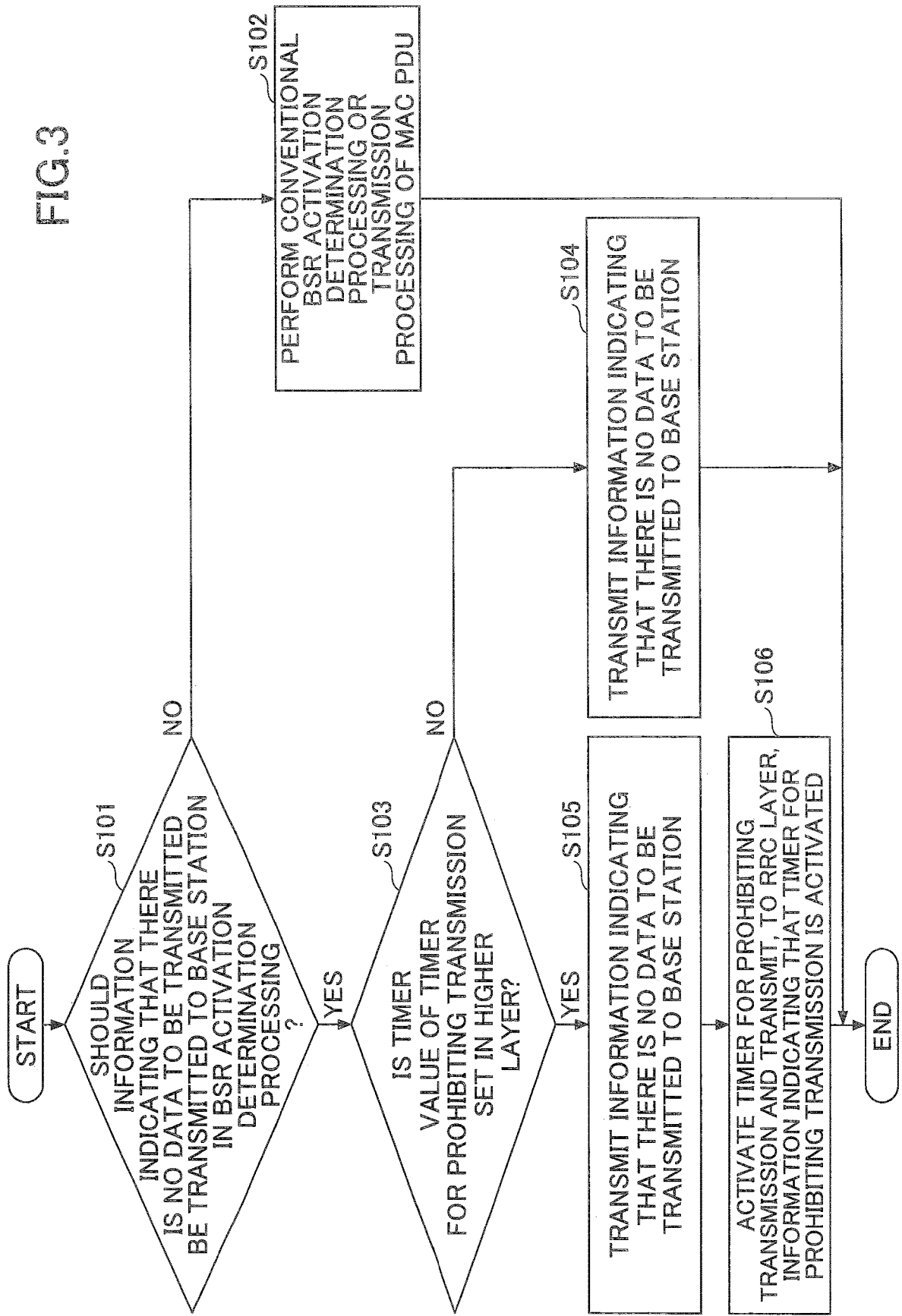

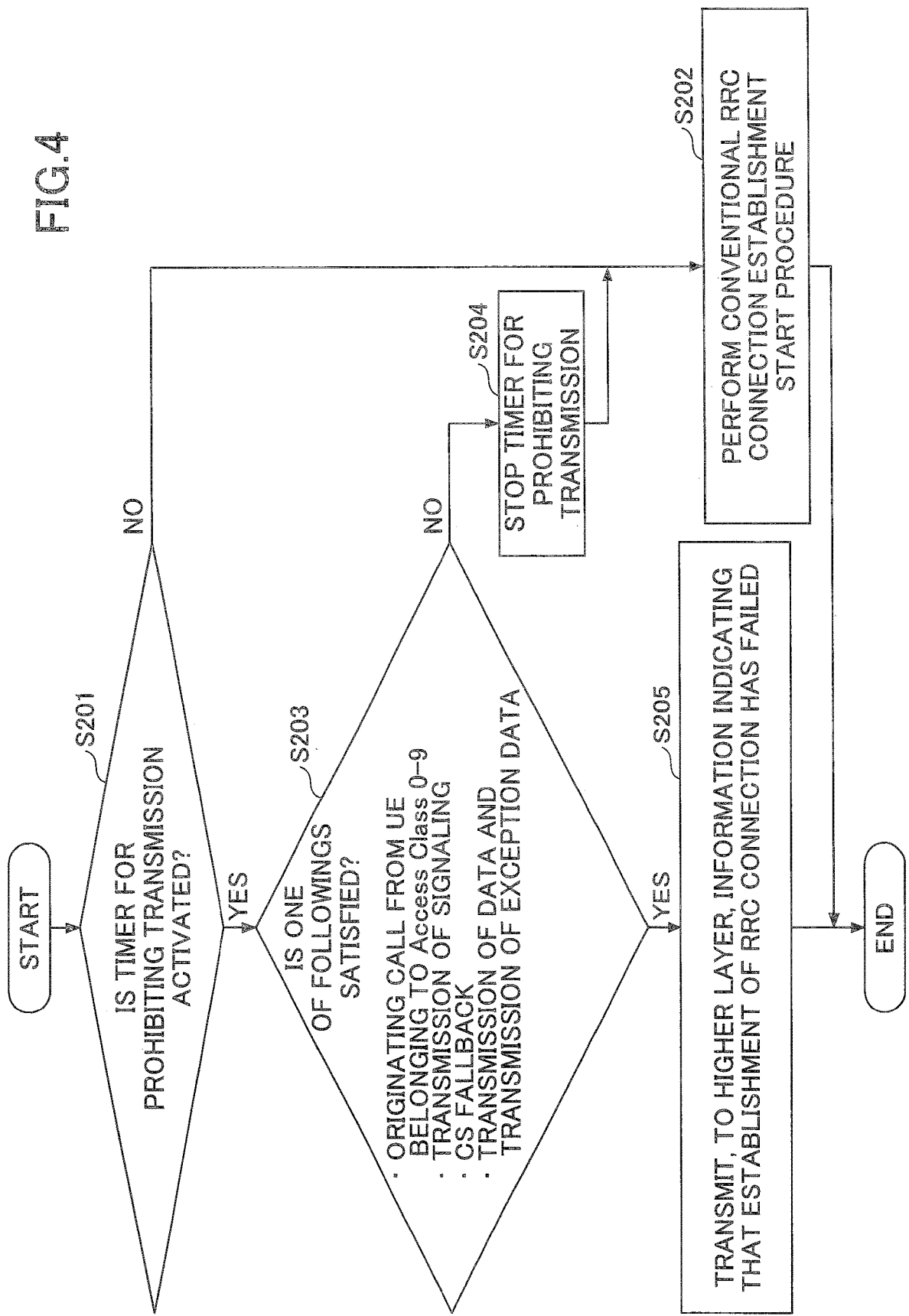

FIG.5

MAC-MainConfig-NB information element

```
-- ASN1_NB_START

MAC-MainConfig-NB-r13 ::=          SEQUENCE {
    ul-SCH-Config-r13              SEQUENCE {
        periodicBSR-Timer-r13         PeriodicBSR-Timer-NB-r13    OPTIONAL,    -- Need ON
        retxBSR-Timer-r13             RetxBSR-Timer-NB-r13
    }                                                             OPTIONAL,    -- Need ON
    drx-Config-r13                    DRX-Config-NB-r13           OPTIONAL,    -- Need ON
    timeAlignmentTimerDedicated-r13   TimeAlignmentTimer,
    phr-Config-r13                    SEQUENCE { }                OPTIONAL,    -- Need ON
    sr-ProhibitTimer-r13                 INTEGER (0..tbd)         OPTIONAL,    -- Need ON
    logicalChannelSR-Config-r13       CHOICE {
        release                       NULL,
        setup                         SEQUENCE {
            logicalChannelSR-ProhibitTimer-r13   ENUMERATED {sf20, sf40, sf64, sf128,
                                                 sf512, sf1024, sf2560, spare1}
        }
    }                                                             OPTIONAL,    -- Need ON
    releaseAssistanceIndication-r13        CHOICE {
        release                              NULL,
        setup                                SEQUENCE {
            mo-DataSignallingExceptionalProhibittimer-r13       ENUMERATED {
                                    min1, min1s20c, min1s40,
                                    min2, min2s30, min3, min3s30, min4, min5, min6,
                                    min7, min8, min9, min10, min12, min14, min17, min20,
                                    min24, min28, min33, min38, min44, min50, hr1,
                                    hr1min30, hr2, hr2min30, hr3, hr3min30, hr4, hr5, hr6,
                                    hr8, hr10, hr13, hr16, hr20, day1, day1hr12, day2,
                                    day2hr12, day3, day4, day5, day7, day10, day14, day19,
                                    day24, day30}
}
...
} drx-ULRetransmissionTimer-r13     ENUMERATED {
                                    pp0, pp1, pp2, pp4, pp6, pp8, pp16, pp24,
                                    pp33, pp40, pp64, pp80, pp96,
                                    pp112, pp128, pp160, pp320 }
    }
}

-- ASN1_NB_STOP
```

FIG.6

| MAC-MainConfig-NB field descriptions |
|---|
| *drx-Config* <br> Used to configure DRX as specified in TS 36.321 [6]. |
| *drx-CycleStartOffset* <br> *longDRX-Cycle* and *drxStartOffset* in TS 36.321 [6]. <br> The value of l*ongDRX-Cycle* is in number of sub-frames. Value sf10 corresponds to 10 sub-frames, sf20 corresponds to 20 sub-frames and so on. The value of *drxStartOffset* value is in number of sub-frames |
| *drx-InactivityTimer* <br> Timer for DRX in TS 36.321 [6]. Value in number of PDCCH periods. Value pp0 correponds to no inactivity timer, pp1 corresponds to 1 PDCCH period, pp2 corresponds to 2 PDCCH periods and so on |
| *drx-RetransmissionTimer* <br> Timer for DRX in TS 36.321 [6]. Value in number of PDCCH periods. Value pp0 correponds to no retransmission timer, pp1 corresponds to 1 PDCCH period, pp2 corresponds to 2 PDCCH periods and so on. |
| *drx-ULRetransmissionTimer* <br> Timer for DRX in TS 36.321 [6]. Value in number of PDCCH periods. Value pp0 correponds to no retransmission timer, value pp1 corresponds to 1 PDCCH period, pp2 corresponds to 2 PDCCH periods and so on. |
| *logicalChannelSR-ProhibitTimer* <br> Timer used to delay the transmission of an SR for logical channels enabled by *logicalChannelSR-Prohibit*. Value sf20 corresponds to 20 subframes, sf40 corresponds to 40 subframes, and so on. See TS 36.321 [6]. |
| *mo-DataSignallingExceptionalProhibitTimer* <br> Timer used to prohibit *mo-Data* and/or *mo-Signalling* and/or *mo-ExceptionData* after the UE includes a BSR MAC CE set to zero bytes in an UL transmission or the UE in an UL transmission does not include a BSR MAC CE in a MAC PDU that has at least two bytes of padding. Value min1 corresponds to 1 minute, hr1 corresponds to 1 hour, and so on. See TS 36.321 [6]. |
| *periodicBSR-Timer* <br> Timer for BSR reporting in TS 36.321 [6]. Value in number of sub-frames. Value sfX corresponds to X sub-frames, sfY corresponds to Y sub-frames and so on. |
| *retxBSR-Timer* <br> Timer for BSR reporting in TS 36.321 [6]. Value in number of sub-frames. Value sf640 corresponds to 640 sub-frames, sf1280 corresponds to 1280 sub-frames and so on. |
| *onDurationTimer* <br> Timer for DRX in TS 36.321 [6]. Value in number of PDCCH periods. Value pp1 corresponds to 1 PDCCH period, pp2 corresponds to 2 PDCCH periods and so on. |
| *sr-ProhibitTimer* <br> TBD |
| *timeAlignmentTimer* <br> Indicates the value of the time alignment timer, see TS 36.321 [6]. |

5.3.3 RRC connection establishment

5.3.3.2 Initiation

The UE initiates the procedure when upper layers request establishment or resume of an RRC connection while the UE is in RRC_IDLE.

Except for NB-IoT, upon initiation of the procedure, the UE shall:

> 1> else if the UE is establishing the RRC connection for mobile terminating calls:
>> 2> if mo-DataSignallingExcetionalProhibitTimer is running:
>>> 3> stop mo-DataSignallingExcetionalProhibitTimer;
>> 2> if timer T302 is running:
>>> 3> inform upper layers about the failure to establish the RRC connection and that access barring for mobile terminating calls is applicable, upon which the procedure ends;
> 1> else if the UE is establishing the RRC connection for emergency calls:
>> 2> if mo-DataSignallingExcetionalProhibitTimer is running:
>>> 3> stop mo-DataSignallingExcetionalProhibitTimer;

> 1> else if the UE is establishing the RRC connection for mobile originating calls:
>> 2> if mo-DataSignallingExcetionalProhibitTimer is running:
>> 2> if the UE has one or more Access Classes, as stored on the USIM, with a value in the range 0 to 9:
>>> 3> inform upper layers about the failure to establish the RRC connection;
>> 2> else:
>>> 3> stop mo-DataSignallingExcetionalProhibitTimer;
>> 2> else:
>> 2> perform access barring check as specified in 5.3.3.11, using T303 as "Tbarring" and *ac-BarringForMO-Data* as "AC barring parameter";
>> 2> if access to the cell is barred:

> 1> else if the UE is establishing the RRC connection for mobile originating signalling:
>> 2> if mo-DataSignallingExcetionalProhibitTimer is running:
>>> 3> inform upper layers about the failure to establish the RRC connection;
>> 2> else:
>> 2> perform access barring check as specified in 5.3.3.11, using T305 as "Tbarring" and *ac-BarringForMO-Signalling* as "AC barring parameter";

> 1> else if the UE is establishing the RRC connection for mobile originating CS fall back:
>> 2> if mo-DataSignallingExcetionalProhibitTimer is running:
>>> 3> inform upper layers about the failure to establish the RRC connection;
>> 2> else:
>> 2> if *SystemInformationBlockType2* includes *ac-BarringForCSFB*:

For NB-IoT, upon initiation of the procedure, the UE shall:

> 1> if the UE is establishing or resuming the RRC connection for mobile originating exception data; or
> 1> if the UE is establishing or resuming the RRC connection for mobile originating data; or
> 1> if the UE is establishing or resuming the RRC connection for mobile originating signalling;
>> 2> if mo-DataSignallingExcetionalProhibitTimer is running:
>>> 3> inform upper layers about the failure to establish the RRC connection;
>> 2> else:
>> 2> perform access barring check as specified in 5.3.3.14;

NOTE 3: Upon initiating the connection establishment or resumption procedure, the UE is not required to ensure it maintains up to date system information applicable only for UEs in RRC_IDLE state. However, the UE needs to perform system information acquisition upon cell re-selection.

FIG.8

5.4.5 Buffer Status Reporting

The Buffer Status reporting procedure is used to provide the serving eNB with information about the amount of data available for transmission in the UL buffers associated with the MAC entity. RRC controls BSR reporting by configuring the three timers *periodicBSR-Timer*, *retxBSR-Timer*, *logicalChannelSR-ProhibitTimer* and *mo-DataSignallingExceptionalProhibitTimer* and by, for each logical channel, optionally signalling *logicalChannelGroup* which allocates the logical channel to an LCG [8].

For the Buffer Status reporting procedure, the MAC entity shall consider all radio bearers which are not suspended and may consider radio bearers which are suspended.

A Buffer Status Report (BSR) shall be triggered if any of the following events occur:

> UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
>
> UL resources are allocated and number of padding bits is equal to or larger than the size of the Buffer Status Report MAC control element plus its subheader, in which case the BSR is referred below to as "Padding BSR";
>
> *retxBSR-Timer* expires and the MAC entity has data available for transmission for any of the logical channels which belong to a LCG, in which case the BSR is referred below to as "Regular BSR";
>
> *periodicBSR-Timer* expires, in which case the BSR is referred below to as "Periodic BSR".

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart *retxBSR-Timer* upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

If *mo-DataSignallingExceptionalProhibitTimer* is configured by upper layers, the MAC entity shall:

- if the UE in an UL transmission does not include a BSR MAC CE in a MAC PDU that has at least two bytes of padding, or

- if the UE includes a BSR MAC CE set to zero byte in an UL transmission:

- start *mo-DataSignallingExceptionalProhibitTimer* and inform upper layers that *mo-DataSignallingExpectionalProhibitTimer* is started after sending MAC PDU including at least two bytes of padding or sending a BSR MAC CE set to zero byte.

NOTE: A Padding BSR is not allowed to cancel a triggered Regular/Periodic BSR. A Padding BSR is triggered for a specific MAC PDU only and the trigger is cancelled when this MAC PDU has been built.

FIG.9

5.4.5 Buffer Status Reporting

The Buffer Status reporting procedure is used to provide the serving eNB with information about the amount of data available for transmission in the UL buffers associated with the MAC entity. RRC controls BSR reporting by configuring the three timers *periodicBSR-Timer, retxBSR-Timer, logicalChannelSR-ProhibitTimer* and *mo-DataSignallingExceptionalProhibitTimer* and by, for each logical channel, optionally signalling *logicalChannelGroup* which allocates the logical channel to an LCG [8].

For the Buffer Status reporting procedure, the MAC entity shall consider all radio bearers which are not suspended and may consider radio bearers which are suspended.

A Buffer Status Report (BSR) shall be triggered if any of the following events occur:

- UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

- UL resources are allocated and number of padding bits is equal to or larger than the size of the Buffer Status Report MAC control element plus its subheader, in which case the BSR is referred below to as "Padding BSR";

- *retxBSR-Timer* expires and the MAC entity has data available for transmission for any of the logical channels which belong to a LCG, in which case the BSR is referred below to as "Regular BSR";

- *periodicBSR-Timer* expires, in which case the BSR is referred below to as "Periodic BSR"

---

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart *retxBSR-Timer* upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

If *mo-DataSignallingExceptionalProhibitTimer* is configured by upper layers, the MAC entity shall:

- if the UE in an UL transmission does not include a BSR MAC CE in a MAC PDU that has at least two bytes of padding, or

- if the UE includes a BSR MAC CE set to zero byte in an UL transmission:

- start *mo-DataSignallingExceptionalProhibitTimer* and inform upper layers that *mo-DataSignallingExpectionalProhibitTimer* is started after sending MAC PDU including at least two bytes of padding or sending a BSR MAC CE set to zero byte.

- if *mo-DataSignallingExpectionalProhibitTimer* is expired:

- inform upper layers that *mo-DataSignallingExpectionalProhibitTimer* is stopped;

NOTE: A Padding BSR is not allowed to cancel a triggered Regular/Periodic BSR. A Padding BSR is triggered for a specific MAC PDU only and the trigger is cancelled when this MAC PDU has been built.

FIG.10

7.3    Timers

| Timer | Start | Stop | At expiry |
|---|---|---|---|
| mo-DataSignallingExcetionalProhibit Timer | Informed from lower layer that MAC PDU including at least two bytes of padding or a BSR MAC CE set to zero byte is sent. | If the UE initiates the RRC connection establishment procedure except for mobile originating call, mobile originating signalling for Access Class 0 to 9 and mobile originating exception data | The UE is allowed to initiate mobile originating call, mobile signalling call and mobile exceptional data call. |

FIG.11

5.4.5 Buffer Status Reporting

The Buffer Status reporting procedure is used to provide the serving eNB with information about the amount of data available for transmission in the UL buffers associated with the MAC entity. RRC controls BSR reporting by configuring the three timers *periodicBSR-Timer, retxBSR-Timer, logicalChannelSR-ProhibitTimer* and *mo-DataSignallingExceptionalProhibitTimer* and by, for each logical channel, optionally signalling *logicalChannelGroup* which allocates the logical channel to an LCG [8].

For the Buffer Status reporting procedure, the MAC entity shall consider all radio bearers which are not suspended and may consider radio bearers which are suspended.

A Buffer Status Report (BSR) shall be triggered if any of the following events occur:

- UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

- UL resources are allocated and number of padding bits is equal to or larger than the size of the Buffer Status Report MAC control element plus its subheader, in which case the BSR is referred below to as "Padding BSR";

- *retxBSR-Timer* expires and the MAC entity has data available for transmission for any of the logical channels which belong to a LCG, in which case the BSR is referred below to as "Regular BSR";

- *periodicBSR-Timer* expires, in which case the BSR is referred below to as "Periodic BSR".

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart *retxBSR-Timer* upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

If *mo-DataSignallingExceptionalProhibitTimer* is configured by upper layers, the MAC entity shall:

- if the UE in an UL transmission does not include a BSR MAC CE in a MAC PDU that has at least two bytes of padding, or

- if the UE includes a BSR MAC CE set to zero byte in an UL transmission:

- inform upper layers that MAC PDU including at least two bytes of padding or a BSR MAC CE set to zero byte is sent.

NOTE: A Padding BSR is not allowed to cancel a triggered Regular/Periodic BSR. A Padding BSR is triggered for a specific MAC PDU only and the trigger is cancelled when this MAC PDU has been built.

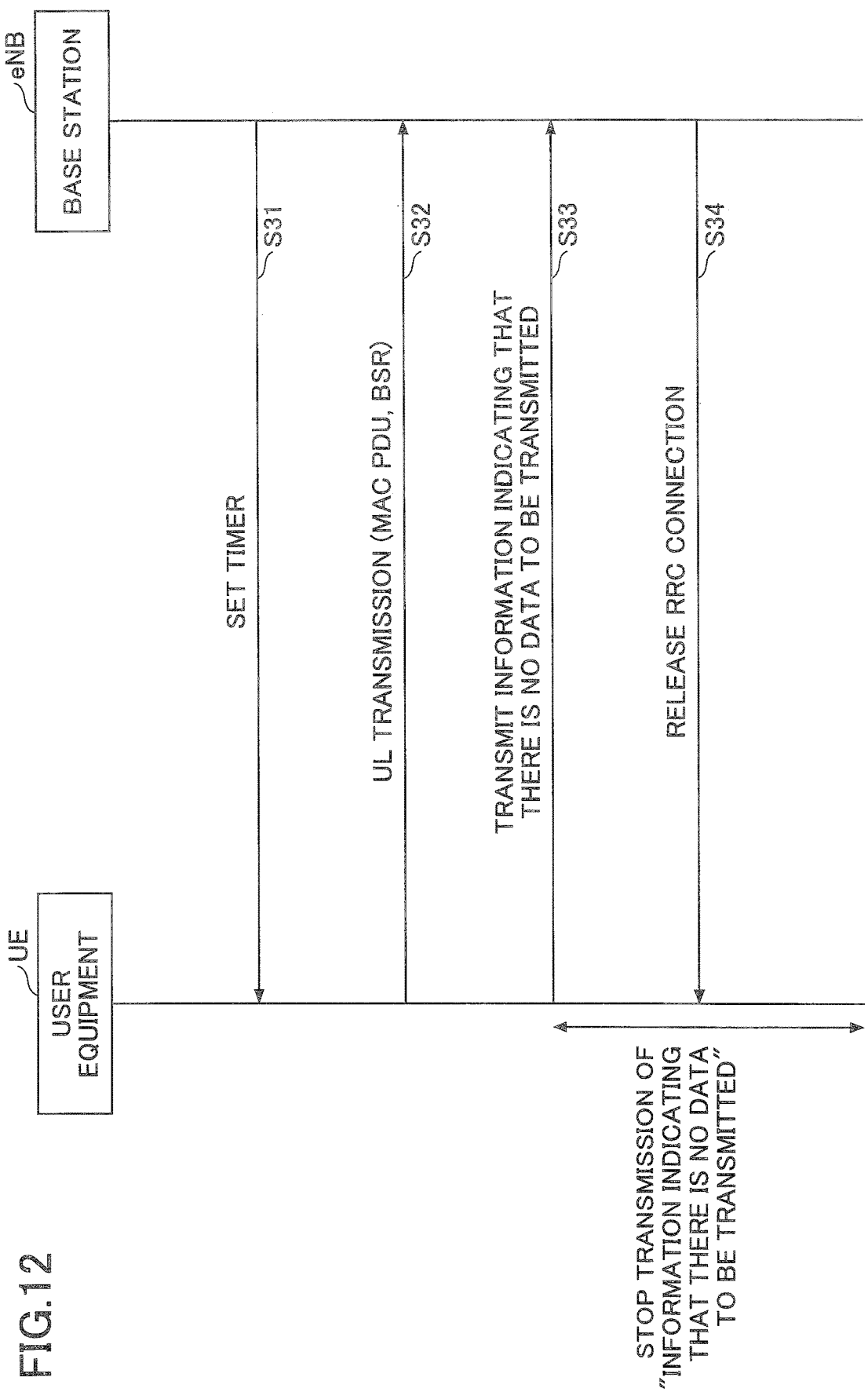

USER EQUIPMENT, BASE STATION, AND SIGNAL TRANSMISSION METHOD

TECHNICAL FIELD

The present invention relates to a user equipment, a base station, and a signal transmission method.

BACKGROUND ART

In a universal mobile telecommunications system (UMTS) network, long term evolution (LTE) was specified for the purpose of higher data rate, low delay, or the like (Non-Patent Document 1). In addition, successor systems of LTE (for example, LTE-advanced (LTE-A), future radio access (FRA), 4G, 5G, or the like) have also been studied for the purpose of further broadening and speeding up from LTE.

In recent years, according to the reduction in the cost of communication devices, inter-device communication (M2M: Machine-to-Machine) which performs automatic control by allowing devices connected to a network to communicating with each other without human intervention has been actively developed. In particular, in third generation partnership project (3GPP), standardization relating to optimization of machine type communication (MTC) as a cellular system for inter-device communication in M2M is promoted (Non-Patent Document 2). In the standardization, various functions to be provided to an (MTC) terminal used for the MTC have been studied, and as an example, an MTC terminal with a limited transmission/reception bandwidth has been in order to reduce the cost. As another example, since there is a possibility that an MTC terminal is considered to be located in a site where intrusion loss of a building such as a deep inside of the building and an underground is large and the wireless communication is hard to perform, the MTC terminal for the purpose of extending the coverage has also been studied. Terminals are classified into the following four patterns on the basis of the above-described two examples.

1. A terminal that has no limitation of the transmission/reception bandwidth and has no coverage extension function
2. A terminal that has limitation of transmission/reception bandwidth and has no coverage extension function
3. A terminal that has no limitation of the transmission/reception bandwidth and has a coverage extension function
4. A terminal that has limitation of the transmission/reception bandwidth and has a coverage extension function The MTC terminal (MTC UE (User Equipment)) is considered to be used in a wide range of fields such as an electric meter, a gas meter, a vending machine, a vehicle, and other industrial equipments.

In addition, in 3GPP Release 13, as an example, studies on MTC terminals realizing further lower cost by restricting the use bandwidth to 180 kHz or less corresponding to the bandwidth corresponding to 1 PRB (Physical Resource Block) have been disclosed (Non-Patent Document 3). The work item (WI) associated with the study is referred to as narrow band-Internet of things (NB-IoT).

CITATION LIST

Non-Patent Document

Non-Patent Document 1: 3GPP TS 36.300 V13.1.0 (2015-09) "Evolved Universal Terrestrial Radio Access (E-UTRA) and Evolved Universal Terrestrial Radio Access Network (E-UTRAN); Overall description; Stage 2"

Non-Patent Document 2: 3GPP TR 36.888 V12.0.0 (2013-06) "Study on provision of low-cost Machine-Type Communications (MTC) User equipments (UEs) based on LTE (Release 12)"

Non-Patent Document 3: 3GPP RP-151621 "New Work Item: NarrowBand IOT (NB-IOT)"

SUMMARY OF THE INVENTION

Problem to be Solved by the Invention

MTC terminals (particularly, NB-IoT terminals) are assumed to transmit a small amount of data at a low frequency. For this reason, at present, in the 3GPP, for the purpose of power saving of the terminal, proposed is a function of transmitting, to the base station, information indicating that there is no UL data to be transmitted and requesting the base station to release RRC connection.

In the 3G network, as a function similar to the above-described function, a function that requests the release of the RRC connection mainly by the terminal (a function called "Fast Dormancy") is provided. However, with the advent of terminals such as smartphones that are assumed to be always connected, the release and establishment of the RRC connection is performed at a high frequency by the operation of this function, which becomes a factor of increasing the signaling amount. Therefore, in the LTE network, it is defined that the release of the RRC connection is performed mainly by the base station, and it is prohibited for the terminal to request the base station to release the RRC connection for the purpose of power saving.

Therefore, in a case where the above-described function is introduced, it is considered that a mechanism for suppressing an increase in signaling amount is required. However, in the current 3GPP, a mechanism of suppressing the increase in signaling amount on the premise of the introduction of the above function is not defined.

The disclosed technology is made in consideration of the above-described problems, and an object of the present invention to provide a technology capable of suppressing an increase in signaling amount in a wireless communication system.

Means for Solving the Problem

A user equipment according to the disclosed technique is a user equipment in a wireless communication system including a base station and the user equipment, the user equipment including: a reception unit configured to receive information for setting a value of a predetermined timer from the base station; and a transmission unit configured to transmit an uplink data in a case where the predetermined timer is not activated, in which the transmission unit activates the predetermined timer in a case where the value of the predetermined timer is set from the base station and information indicating that there is no uplink data to be transmitted is transmitted to the base station.

Effect of the Invention

According to the disclosed technique, there is provided a technique capable of suppressing an increase in signaling amount in a wireless communication system.

BRIEF DESCRIPTION OF DRAWINGS

FIG. 3 is a flowchart illustrating an example of a processing procedure in an MAC layer according to the first embodiment;

FIG. 4 is a flowchart illustrating an example of a processing procedure in an RRC layer according to the first embodiment;

FIG. 5 is a diagram illustrating a specification change example;

FIG. 6 is a diagram illustrating a specification change example;

FIG. 7 is a diagram illustrating a specification change example;

FIG. 8 is a diagram illustrating a specification change example;

FIG. 9 is a diagram illustrating a specification change example (Modified Example 1);

FIG. 10 is a diagram illustrating a specification change example (Modified Example 2);

FIG. 11 is a diagram illustrating a specification change example (Modified Example 2);

FIG. 12 is a sequence diagram illustrating an example of a processing procedure performed by a wireless communication system according to a second embodiment;

MODE(S) FOR CARRYING OUT THE INVENTION

Hereinafter, embodiments of the present invention will be described with reference to the drawings. The embodiments described hereinafter are merely exemplary ones, and the embodiments to which the present invention is applied are not limited to the following embodiments. For example, although it is assumed that the wireless communication system according to the embodiment is a system based on the LTE, the present invention is not limited to the LTE, but the present invention can be applied to other systems. In the specification and the claims, the term "LTE" is used in a broad sense including not only to the communication method corresponding to 3GPP Release 8 or 9 but also to the fifth generation (5G) communication method corresponding to 3GPP Release 10, 11, 12, 13, 14 or later.

First Embodiment

<System Configuration>

Figure 1:
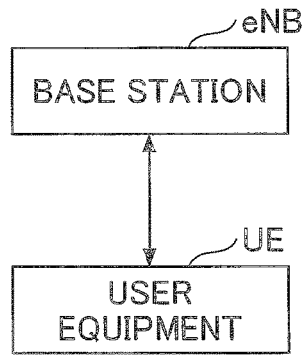
FIG. 1 is a diagram illustrating a configuration example of a wireless communication system according to a first embodiment.

FIG. 1 is a diagram illustrating a configuration example of a wireless communication system according to an embodiment. As illustrated in FIG. 1, the wireless communication system according to the embodiment is configured to further include a base station eNB and a user equipment UE. In the example of FIG. 1, one base station eNB and one user equipment UE are illustrated, but a plurality of the base stations eNBs may be used, or a plurality of the user equipments UEs may be used.

The user equipment UE may be a terminal used by a general user such as a smartphone, may be an MTC terminal, or may be an NB-IoT terminal. Namely, the first embodiment can be applied to any type of user equipment UE.

<Processing Procedure>

(Processing Sequence)

In the first embodiment, the user equipment UE transmits information indicating that there is no UL data to be transmitted to the base station eNB and requests the base station eNB to release RRC connection. However, in the case of receiving the indication, the base station eNB side can be allowed to switch between whether or not to operate so as to release the RRC connection.

The information indicating that there is no UL data to be transmitted may be any information, but for example, the information may be MAC PDU not including buffer status report medium access control control element (BSR MAC CE) and including at least 2 bytes of padding or may be MAC PDU including BSR MAC CE indicating 0 byte.

Figure 2A:
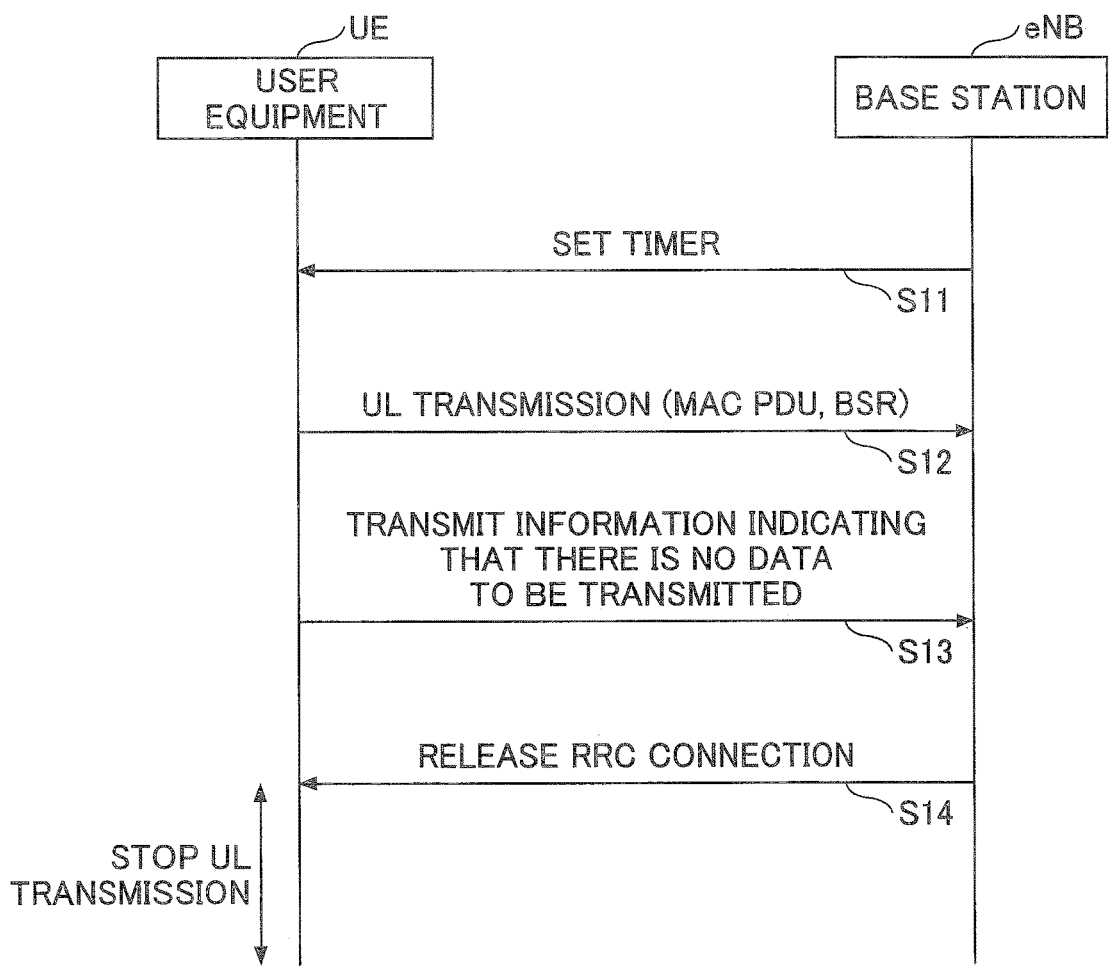
FIG. 2A is a sequence diagram illustrating an example of a processing procedure performed by the wireless communication system according to the first embodiment.

FIG. 2A illustrates a sequence in a case where the base station eNB operates so as to release the RRC connection in the case of receiving the information indicating that there is no UL data to be transmitted.

In step S11, the base station eNB sets the timer value of a "timer for prohibiting transmission of an UL data for a predetermined period" to the user equipment UE by using broadcast information (SIB) or an RRC message. The "timer for prohibiting transmission of an UL data for a predetermined period" may be referred to as, for example, a "moDataSignallingExceptionalProhibittimer", but not limited thereto. In the first embodiment, by setting the timer to the user equipment UE, in the case of receiving the information indicating that there is no UL data to be transmitted, the user equipment UE is informed that the base station eNB operates so as to release the RRC connection. In addition, this operation may be referred to as, for example, "release Assistance Indication function".

In step S12, the user equipment UE transmits the UL data, and in a case where the transmission of all UL data is completed, in step S13, the information indicating that there is no UL data to be transmitted is transmitted to the base station eNB.

In step S14, the base station eNB releases the RRC connection. After the RRC connection is released, the user equipment UE operates so as not to request the establishment of the RRC connection to the base station eNB until the "timer for prohibiting transmission of an UL data for a predetermined period" expires. Namely, while the "timer for prohibiting transmission of an UL data for a predetermined period" is activated, the user equipment UE operates so as not to transmit the UL data by maintaining the state of RRC_IDLE.

Figure 2B:
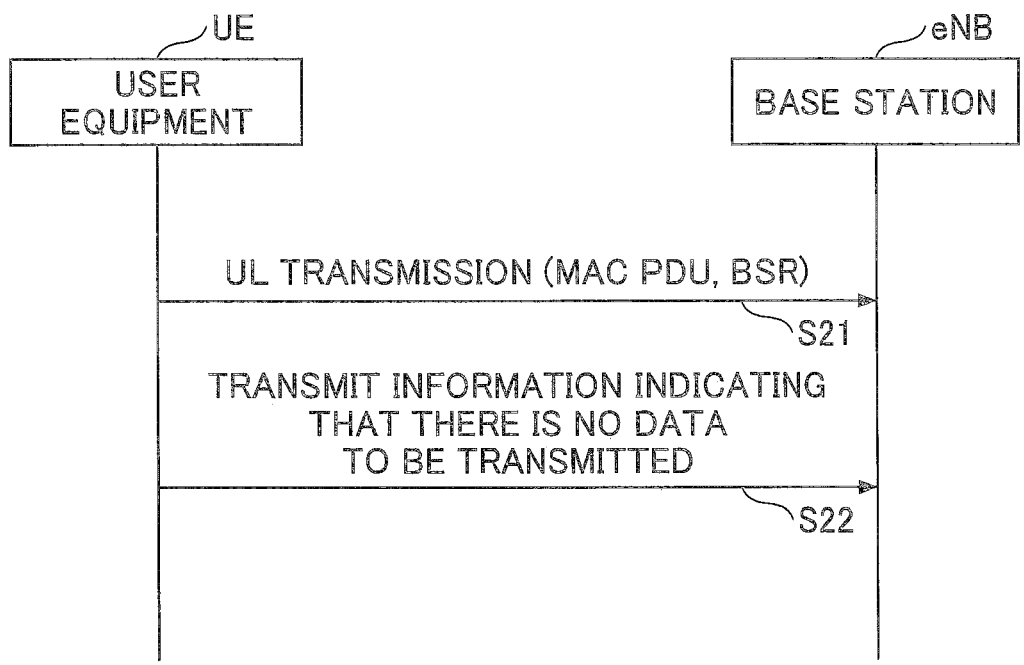
FIG. 2B is a sequence diagram illustrating an example of a processing procedure performed by the wireless communication system according to the first embodiment.

FIG. 2B illustrates a sequence in a case where the base station eNB does not release the RRC connection even in the case of receiving the information indicating that there is no UL data to be transmitted. Namely, the operations in FIG. 2B are the same as those in the LTE of the related art. The processing procedures of steps S21 and S22 are the same as those of steps S11 and S12, respectively, and the description thereof will be omitted. Unlike FIG. 2A, in the case of FIG. 2B, in the case of receiving the information indicating that there is no UL data to be transmitted, the base station eNB operates so as not to perform the scheduling of the UL resources (UL grant) similarly to the LTE in the related art and operates so as not to release the RRC connection.

(MAC Layer Processing)

Next, the processing procedure performed by the MAC layer of the user equipment UE according to the first embodiment will be described.

FIG. 3 is a flowchart illustrating an example of a processing procedure in the MAC layer. The MAC layer performs processing for determining whether or not to activate (trigger) buffer status report (BSR) in order to report the amount of UL data accumulated in the buffer in the MAC entity to the base station eNB. The flowchart illustrated in FIG. 3 illustrates a processing procedure performed when the processing for determining whether or not to activate the BSR (hereinafter, referred to as "BSR activation determination processing") is started.

In step S101, in a case where, as a result of the BSR activation determination processing, the user equipment UE determines that the information indicating that there is no UL data to be transmitted is to transmitted to the base station eNB, the processing proceeds to the processing procedure of step S103. In the other cases (a case where there is an UL data to be transmitted, and the like), the processing proceeds to the processing procedure of step S102.

In step S102, the user equipment UE performs the BSR activation determination processing in accordance with the regulations of the LTE in the related art and also performs transmission processing of MAC PDU including BSR MAC CE if necessary.

In step S103, the user equipment UE determines whether or not the timer value of the "timer for prohibiting transmission of an UL data for a predetermined period" is set in the higher layer (RRC layer). In a case where the timer value is set, the processing proceeds to step S105, and in a case where the timer value is not set, the processing proceeds to step S104.

In step S104, the user equipment UE transmits, to the base station eNB, the information indicating that there is no UL data to be transmitted. In this case, as described in FIG. 2(b), the base station eNB operates so as not to release the RRC connection even in a case where receiving the information indicating that there is no UL data to be transmitted.

In step S105, the user equipment UE transmits, to the base station eNB, the information indicating that there is no UL data to be transmitted. After transmitting, to the base station eNB, the information indicating that there is no UL data to be transmitted, in step S106, the user equipment UE activates (starts) the "timer for prohibiting transmission of an UL data for a predetermined period" and transmits, to the RRC layer, information indicating that the timer is activated.

(RRC Layer Processing)

Next, a processing procedure performed by the RRC layer of the user equipment UE according to the first embodiment will be described.

FIG. 4 is a flowchart illustrating an example of a processing procedure in the RRC layer. The processing procedure illustrated in FIG. 4 is performed in the RRC_IDLE state in a case where the higher layer (NAS (Non Access Stratum) layer) requests the RRC layer to establish the RRC connection.

In step S201, the user equipment UE determines whether the "timer for prohibiting transmission of an UL data for a predetermined period" is activated. In a case where the timer is activated, the processing proceeds to the process procedure of step S203, and in a case where the timer is not activated, the processing proceeds to the process procedure of step S202.

In step S202, the user equipment UE executes a RRC connection establishment start procedure defined in the 3GPP specification in the related art.

In step S203, the user equipment UE determines whether or not the establishment of the RRC connection is requested from the higher layer (NAS layer) for the purpose of an originating call (mobile originating call) from the UEs belonging to Access Class 0-9, transmission of signaling (mobile originating signaling), CS fallback (mobile originating CS fallback), transmission of exception data (mobile originating exception data), and transmission of data (mobile originating data). Therefore, in the case for the reason, the processing proceeds to the processing procedure of step S204, and in the case for the other reasons (for example, an incoming call, an originating call from a UE belonging to the Access Class 11-15, an emergency call, or the like), the processing proceeds to the processing procedure of step S205.

In step S204, the user equipment UE stops the "timer for prohibiting transmission of an UL data for a predetermined period" and executes the RRC connection establishment start procedure defined in the 3GPP specification in the related art in step S202, so that the user equipment UE performs receiving an incoming call, originating a call from the UE belonging to the Access Class 11-15 and originating an emergency call. In addition, stopping the "timer for prohibiting transmission of an UL data for a predetermined period" is to avoid the state where the timer is operating irrespective of RRC CONNECTED. If such a condition is permitted, the processing procedure of step S204 may be omitted, and the processing may proceed to step S202.

In step S205, the user equipment UE transmits, to the higher layer (NAS layer), information indicating that the establishment of the RRC connection has failed (namely, the RRC connection cannot be established since the timer is activated).

(Specification Change Example)

A specification change example of the 3GPP specification corresponding to the processing procedure described above is illustrated. The underlined portions in FIGS. 5 and 6 illustrate a specification change example (TS 36.331) of information elements for setting the timer value of the "timer for prohibiting transmission of an UL data for a predetermined period" to the user equipment UE. In the example of FIGS. 5 and 6, although an example of the information elements (MAC-MainConfig-NB information elements) indicating the MAC layer setting for the user equipment UE corresponding to a narrow band (NB) is illustrated, since the first embodiment can be applied to any user equipment UE, the modified example of the underlined portions in FIGS. 5 and 6 may be included in the information elements (MAC-MainConfig information elements) indicating the MAC layer setting for the normal user equipment UE.

In addition, the information elements for setting the timer value of the "timer for prohibiting transmission of an UL data for a predetermined period" to the user equipment UE is set to the information elements indicating the MAC layer setting for the user equipment UE corresponding to the narrow band, it is possible to allow only the user equipment UE corresponding to the narrow band to execute the operations described in the first embodiment.

The underlined portions of FIG. 7 illustrate a specification change example (TS 36.331) relating to the operation of the RRC layer, and the underlined portions of FIG. 8 illustrate a specification change example (TS 36.321) relating to the operation of the MAC layer.

Modified Example 1

In the processing procedure described above, it is assumed that referring to the state (whether or not it is activated) of, activating, and stopping the "timer for prohibiting transmission of an UL data for a predetermined period" is performed by both the MAC layer and the RRC layer. On the other hand, in Modified Example 1, the referring to the state of the timer may be performed by only at the MAC layer, and the MAC layer transmits the state of the timer to the RRC layer. More specifically, in the case of detecting that the "timer for prohibiting transmission of an UL data for a predetermined period" expires, the MAC layer of the user equipment UE transmits, to the higher layer (RRC layer), information indicating that the "timer for prohibiting transmission of an UL data for a predetermined period" is stopped.

(Specification Change Example)

FIG. 9 illustrates a specification change example (TS 36.321) relating to the operations of the MAC layer corresponding to Modified Example 1. The specification change examples of FIGS. 5 to 8 are also applied to Modified Example 1.

Modified Example 2

In Modified Example 2, referring to the state of, activating, and stopping the "timer for prohibiting transmission of an UL data for a predetermined period" are all performed only in the RRC layer. In addition, the RRC layer transmits, to the MAC layer, the state of the timer.

In Modified Example 2, in the processing procedure of step S106 in FIG. 3, the user equipment UE performs the processing of notifying (indicating) the high layer (RRC layer) that the information indicating that there is no data to be transmitted is transmitted to the base station instead of the processing of "activating (starting) the "timer for prohibiting transmission of an UL data for a predetermined period" and notifying the high layer (RRC layer) that the timer is activated".

In addition, in the case of receiving, from the MAC layer, the notification that information indicating that there is no data to be transmitted is transmitted to the base station, the RRC layer activates the "timer for prohibiting transmission of an UL data for a predetermined period".

(Specification Change Example)

FIG. 10 illustrates a specification change example (TS 36.331) relating to the operation of the RRC layer corresponding to Modified Example 2. In addition, FIG. 11 illustrates a specification change example (TS 36.321) relating to the operation of the MAC layer corresponding to Modified Example 2. The specification change examples of FIGS. 5 to 7 are also applied to Modified Example 2.

<Supplementary Matters Relating to Processing Procedure of First Embodiment>

In the processing procedure of the first embodiment described above, the type of the "UL data" that cannot be transmitted while the "timer for prohibiting transmission of an UL data for a predetermined period" is activated may be all the types such as an originating call (mobile originating call) from the UEs belonging to Access Class 0-9, transmission of signaling (mobile originating signaling), CS fallback (mobile originating CS fallback), transmission of exception data (mobile originating exception data), and transmission of data (mobile originating data) or may be a portion of these types.

In the latter case, in step S203 of FIG. 4, only in a case where a higher layer (NAS layer) requests the user equipment UE to establish the RRC connection in order to transmit a type of the UL data that cannot be transmitted while the timer is activated, the processing proceeds to the processing procedure of step S205. As an example, in a case where the establishment of the RRC connection is requested for the purpose of the CS fallback in step S203 of FIG. 4, the processing may proceed to the processing procedure of step S204 instead of proceeding to the processing procedure of step S205.

In addition, the type of "UL data" that cannot be transmitted while the "timer for prohibiting transmission of an UL data for a predetermined period" is activated is not limited to the above-described type, but another type may be included. For example, in a case where the establishment of the RRC connection is requested for the purpose of a VoLTE call (Voice over LTE) of voice service by IMS and a ViLTE call (Video over LTE) of video service by the IMS in step S203 of FIG. 4, the processing may proceed to the processing procedure of S205. In addition, with respect to the VoLTE call and the ViLTE call, the processing may proceed to step S204 instead of step S205.

In the case of receiving, from the base station eNB, an explicit notification that a function according to the embodiment (a function of operating so as to release the RRC connection in the case of receiving the notification that there is no UL data to be transmitted ("release Assistance Indication function")) is stopped, the user equipment UE may be allowed to stop the "timer for prohibiting transmission of an UL data for a predetermined period". The explicit notification may be used, for example, in a case where an RRC message (RRC Connection setup, RRC Connection Reconfiguration, or the like) indicating that the "Release Assistance Indication function" is to be stopped (released) is received from the base station eNB.

Heretofore, the processing procedure performed by the wireless communication system according to the first embodiment has been described. According to the first embodiment, in the case of receiving, from the user equipment UE, the information indicating that there is no UL data to be transmitted, the base station eNB can be allowed to switch between whether or not to operate so as to release the RRC connection.

In addition, since the user equipment UE operates so as not to transmit the UL data while the "timer for prohibiting transmission of an UL data for a predetermined period" is activated, frequent repetition of the release and establishment of the RRC connection can be prevented, so that it possible to suppress an increase in signaling amount.

Second Embodiment

Subsequently, a second embodiment will be described. In the first embodiment, the user equipment UE is configured so as not to transmit the UL data while the "timer for prohibiting transmission of an UL data for a predetermined period" is activated. On the other hand, in the second embodiment, the base station eNB sets, to the user equipment UE, a "timer for prohibiting notification that there is no UL data to be transmitted for a predetermined period" instead of the "timer for prohibiting transmission of an UL data for a predetermined period", and the user equipment UE is configured so as not to transmit, to the base station eNB, the information indicating that there is no UL data to be transmitted while the "timer for prohibiting notification that there is no UL data to be transmitted for a predetermined period" (hereinafter, for the convenience of description, referred to as "transmission prohibit timer") is activated. Since the "information indicating that there is no UL data to be transmitted" is the same as that in the first embodiment, the description thereof will be omitted.

<System Configuration>

Since the system configuration is the same as that of the first embodiment, the description thereof will be omitted.

<Processing Procedure>

(Processing Sequence)

In the second embodiment, similarly to the first embodiment, the user equipment UE transmits, to the base station eNB, the information indicating that there is no UL data to be transmitted and requests the base station eNB to release the RRC connection. In addition, in the case of receiving the notification (indication), the base station eNB side can be allowed to switch between whether or not to operate so as to release the RRC connection.

FIG. 12 illustrates a sequence in a case where the base station eNB operates so as to release the RRC connection in the case of receiving the notification (indication) that there is no UL data to be transmitted.

In step S31, the base station eNB sets the timer value of the "transmission prohibit timer" to the user equipment UE by using the broadcast information (SIB) or the RRC message. In the second embodiment, similarly to the first embodiment, by setting the timer to the user equipment UE, in the case of receiving the notification that there is no UL data to be transmitted, the user equipment UE is informed that the base station eNB operates to release the RRC connection. In addition, similarly to the first embodiment, this operation may be referred to as, for example, "release Assistance Indication function".

The timer value of the "transmission prohibit timer" may be included in an information element (MAC-MainConfig-NB information element) indicating the MAC layer setting for the user equipment UE corresponding to the narrow band or an information element (MAC-MainConfig information element) indicating the MAC layer setting for the normal user equipment UE.

In step S32, the user equipment UE transmits UL data, and in a case where the transmission of all the UL data is completed, in step S33, the user equipment transmits, to the base station eNB, the information indicating that there is no UL data to be transmitted. In addition, after transmitting, to the base station eNB, the information indicating that there is no UL data to be transmitted, the user equipment UE activates the "transmission prohibit timer". In step S34, the base station eNB releases the RRC connection.

Until the transmission prohibit timer expires, even in a case where there is no UL data to be re-transmitted, the user equipment UE is configured so as not to transmit, to the base station eNB, the information indicating that there is no UL data to be transmitted. Namely, although the transmission itself of the UL data is not prohibited even while the transmission prohibit timer is activated, after the transmission of the UL data is completed, the transmission of the information indicating that there is no UL data to be transmitted to the base station eNB is prohibited.

(MAC Layer Processing)

Subsequently, a processing procedure performed by the MAC layer of the user equipment UE according to the second embodiment will be described.

Figure 13:
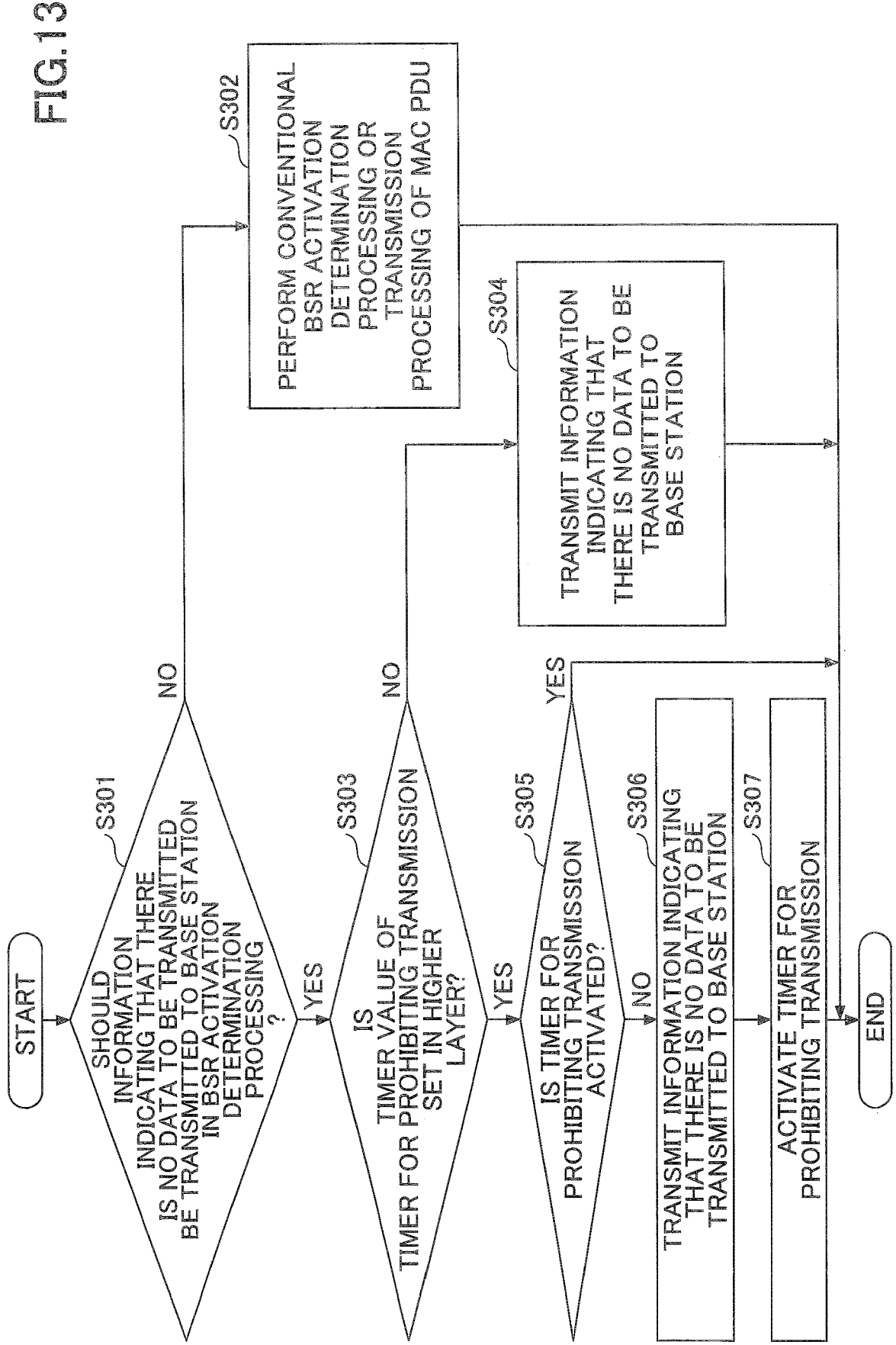
FIG. 13 is a flowchart illustrating an example of a processing procedure in an MAC layer according to the second embodiment.

FIG. 13 is a flowchart illustrating an example of a processing procedure in the MAC layer. The flowchart illustrated in FIG. 13 illustrates the processing procedure performed in a case where the BSR activation determination processing is started similarly to FIG. 3 described in the first embodiment.

In step S301, in a case where, as a result of the BSR activation determination processing, the user equipment UE determines that the information indicating that there is no UL data to be transmitted is transmitted to the base station eNB, the processing proceeds to the processing procedure of step S303. In the other cases (a case where there is an UL data to be transmitted, and the like), the processing proceeds to the processing procedure of step S302.

In step S302, the user equipment UE performs the BSR activation determination processing in accordance with the regulations of the LTE in the related art and also performs transmission processing of MAC PDU including the BSR MAC CE if necessary.

In step S303, the user equipment UE determines whether or not the timer value of the "transmission prohibit timer" is set in the higher layer (RRC layer). In a case where the timer value is set, the processing proceeds to the process procedure of step S305, and in a case where the timer value is not set, the processing proceeds to the process procedure of step S304.

In step S304, the user equipment UE transmits, to the base station eNB, the information indicating that there is no UL data to be transmitted. In this case, as described with reference to FIG. 2(b) of the first embodiment, even in the case of receiving the notification that there is no UL data to be transmitted, the base station eNB operates so as not to release the RRC connection.

In step S305, the user equipment UE determines whether or not the "transmission prohibit timer" is activated. In a case where the "transmission prohibit timer" is activated, the processing is ended, and in a case where the "transmission prohibit timer" not activated, the processing proceeds to step S306.

In step S306, the user equipment UE transmits, to the base station eNB, the information indicating that there is no UL data to be transmitted. After transmitting, to the base station eNB, the information indicating that there is no UL data to be transmitted, the user equipment UE activates (starts) the "transmission prohibit timer" in step S307.

<Supplementary to Processing Procedure According to Second Embodiment>

In the case of receiving, from the base station eNB an explicit notification that a function according to the embodiment (a function of operating so as to release the RRC connection in the case of receiving the notification (indication) that there is no UL data to be transmitted ("release Assistance Indication function")) is stopped, the user equipment UE may be allowed to stop the "transmission prohibit timer". The explicit notification may be used, for example, in a case where an RRC message (RRC Connection setup, RRC Connection Reconfiguration, or the like) indicating that the "Release Assistance Indication Function" is to be stopped (Released) is received from the base station eNB.

Heretofore, the processing procedure performed by the wireless communication system according to the second embodiment has been described. According to the second embodiment, in the case of receiving, from the user equipment UE, the information indicating that there is no UL data to be transmitted, the base station eNB can be allowed to switch between whether or not to operate so as to release the RRC connection.

In addition, since the user equipment UE operates so as not to transmit, to the base station eNB, the information indicating that there is no UL data to be transmitted while the "timer for prohibiting notification that there is no UL data to be transmitted for a predetermined period" is activated, frequent repetition of the release and establishment of the RRC connection can be prevented, so that it possible to suppress an increase in signaling amount.

Third Embodiment

Subsequently, a third embodiment will be described. In the third embodiment, in the case of receiving the notification that there is no UL data to be transmitted, the base station eNB sets the information " " indicating whether or not to operate so as to release the RRC connection (hereinafter, for the convenience of description, referred to as "operation Setting information") to the user equipment UE by using the broadcast information (SIB) or the RRC message (RRC Connection setup, RRC Connection Reconfiguration, or the like). In addition, the operation may be referred to as, for example, "release Assistance Indication function", similarly to the first and second embodiments.

The "operation setting information" may be included in an information element indicating the MAC layer setting for the user equipment UE corresponding to the narrow band (MAC-MainConfig-NB information element), or an information element indicating the MAC layer setting for the normal user equipment UE (MAC-MainConfig information element). The "operation setting information" may be referred to as, for example, "release Assistance Indication" or another name may be used.

In the third embodiment, unlike the first and second embodiments, the user equipment UE can perform transmission of a UL data and notification that there is no UL data to be transmitted without particular limitation. In other words, how to operate on the setting value of "operation setting information" depends on the implementation of the user equipment UE.

On the other hand, in a case where the "operation setting information" is set to "Operate (True, Enable, Setup)", the base station eNB having received the notification that there is no UL data to be transmitted operates to release the RRC connection. In addition, in a case where the "operation setting information" is set to "Not Operate (False, Disable, Release)", the base station eNB having received the notification that there is no UL data to be transmitted operates so as not to perform the scheduling (UL grant) of the UL resources and operates so as not to release the RRC connection similarly to the LTE in the related art.

Heretofore, the processing procedure performed by the wireless communication system according to the third embodiment has been described. According to the third embodiment, in the case of receiving, from the user equipment UE, the information indicating that there is no UL data to be transmitted, the base station eNB can be allowed to switch between whether or not to operate so as to release the RRC connection.

<<Functional Configuration>>

Hereinafter, a functional configuration example of the user equipment UE and the base station eNB which perform the operations of each embodiment of the present invention will be described.

(User Equipment)

Figure 14:
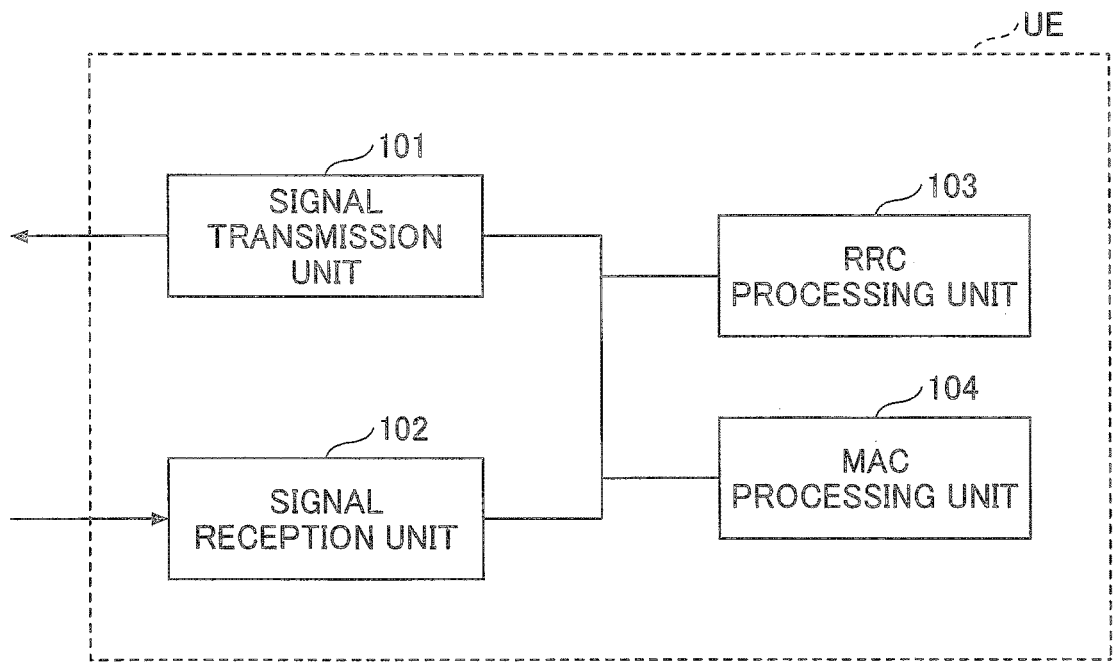
FIG. 14 is a diagram illustrating a functional configuration example of a user equipment according to each embodiment.

FIG. 14 is a diagram illustrating a functional configuration example of a user equipment according to each embodiment. As illustrated in FIG. 14, the user equipment UE is configured to include a signal transmission unit 101, a signal reception unit 102, an RRC processing unit 103, and a MAC processing unit 104. In addition, FIG. 14 illustrates only the functional units particularly relating to the present invention in the user equipment UE, and the user equipment UE also has a function (not illustrated) for performing at least operation in accordance with the LTE.

The signal transmission unit 101 has a function of generating various types of signals of the physical layer from the signals of the higher layer to be transmitted from the user equipment UE and wirelessly transmitting the signals. In addition, the signal transmission unit 101 has a function of transmitting the uplink data after establishing the RRC connection in a case where a predetermined timer ("timer for prohibiting transmission of an UL data for a predetermined period") is not activated.

The signal reception unit 102 has a function of wirelessly receiving various types of signals from the base station eNB and acquiring signals of the higher layers from the received signals of the physical layer.

The RRC processing unit 103 has a function of performing processing of the RRC layer. In addition, the RRC processing unit 103 has a function of receiving the information for setting a value of a predetermined timer (information element for setting the timer value of the "timer for prohibiting transmission of an UL data for a predetermined period" or the "timer for prohibiting notification that there is no UL data to be transmitted for a predetermined period") from the base station eNB through the signal reception unit 102. In addition, in a case where the predetermined timer ("timer for prohibiting transmission of an UL data for a predetermined period") is activated, the RRC processing unit 103 does not establish the RRC connection so that no uplink data is transmitted from the signal transmission unit 101. In addition, in a case where the predetermined timer ("timer for prohibiting transmission of an UL data for a predetermined period") is not activated, the RRC processing unit 103 establishes the RRC connection according to the request of the higher layer (NAS layer).

The MAC processing unit 104 has a function of performing processing of the MAC layer. The MAC processing unit 104 may be allowed to activate a predetermined timer (a "timer for prohibiting transmission of an UL data for a predetermined period" or a "timer for prohibiting notification that there is no UL data to be transmitted for a predetermined period") in a case where the value of the predetermined timer is set from the base station eNB and in a case where the "information indicating that there is no uplink data to be transmitted" is transmitted to the base station eNB.

In addition, in a case where the value of the predetermined timer ("timer for prohibiting transmission of an UL data for a predetermined period") is set from the base station eNB and the "information indicating that there is no uplink data to be transmitted" is transmitted to the base station eNB, the MAC processing unit 104 may be allowed to notify the RRC processing unit 103 that the "information indicating that there is no uplink data to be transmitted" is transmitted to the base station eNB so as to allow the RRC processing unit 103 to activate the predetermined timer ("timer for prohibiting transmission of an UL data for a predetermined period").

In addition, until the predetermined timer ("timer for prohibiting notification that there is no UL data to be transmitted for a predetermined period") expires, the MAC processing unit 104 may be allowed not to transmit the "information indicating that there is no uplink data to be transmitted" to the base station eNB.

In addition, the signal transmission unit 101, the RRC processing unit 103, and the MAC processing unit 104 may be collectively referred to as a transmission unit. In addition, the signal reception unit 102 and the RRC processing unit 103 may be collectively referred to as a reception unit, or the signal reception unit 102, the RRC processing unit 103, and the MAC processing unit 104 may be collectively referred to as a reception unit.

(Base Station)

Figure 15:
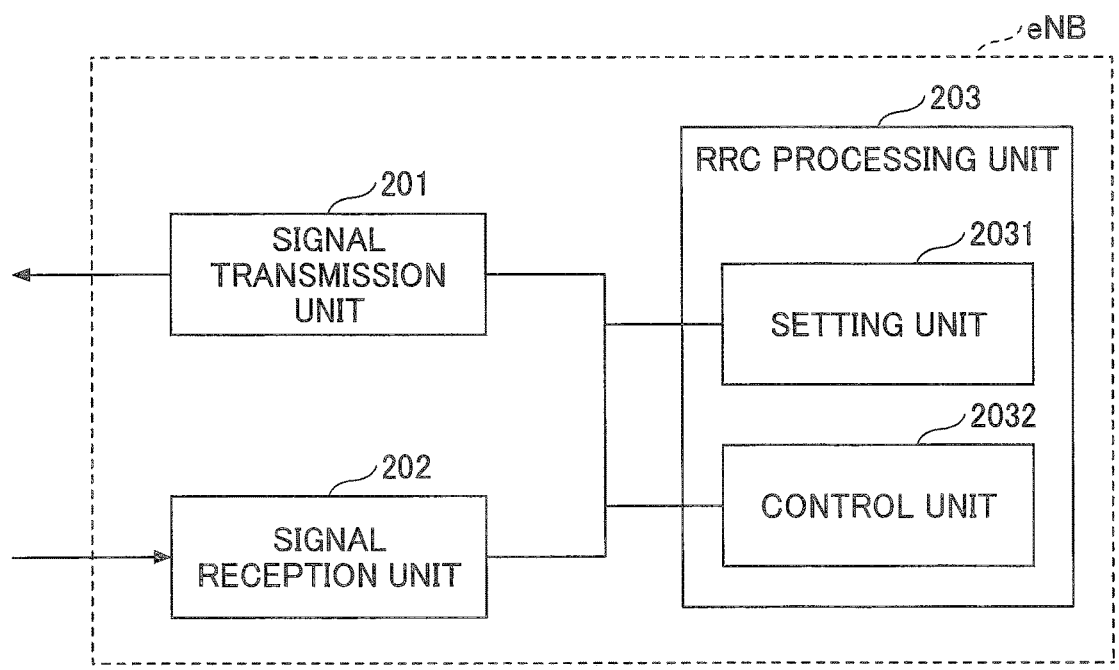
FIG. 15 is a diagram illustrating a functional configuration example of a base station according to each embodiment.

FIG. 15 is a diagram illustrating a functional configuration example of a base station according to each embodiment. As illustrated in FIG. 15, the base station eNB is configured to include a signal transmission unit 201, a signal reception unit 202, and an RRC processing unit 203. In addition, the RRC processing unit 203 is configured to further include a setting unit 2031 and a control unit 2032. In addition, FIG. 15 illustrates only the functional units particularly relating to the embodiment of the present invention in the base station eNB, and also has a function (not illustrated) for performing at least operation in accordance with the LTE. In addition, the functional configuration illustrated in FIG. 15 is merely an example. As long as the operation according to each embodiment can be executed, any functional division and any names of functional units may be available.

The signal transmission unit 201 has a function of generating various types of signals to be transmitted from the base station eNB and wirelessly transmitting the signals. The signal reception unit 202 has a function of wirelessly receiving various types of signals from the user equipment UE and acquiring signals of the higher layer from the received signals of the physical layer.

The RRC processing unit 203 has a function of performing processing of the RRC layer. The setting unit 2031 has a function of setting a value of predetermined information (a "timer for prohibiting transmission of an UL data for a predetermined period", a "timer for prohibiting notification that there is no UL data to be transmitted for a predetermined period", or an "operation setting information") to the user equipment UE. The control unit 2032 has a function of releasing the RRC connection with the user equipment UE in the case of setting the value of the predetermined information (the "timer for prohibiting transmission of an UL data for a predetermined period", the "timer for prohibiting notification that there is no UL data to be transmitted for a predetermined period", or the "operation setting information") to the user equipment UE and in the case of receiving the information indicating that there is no uplink data to be transmitted from the user equipment UE.

<Hardware Configuration>

The block diagrams (FIGS. 14 and 15) used in the description of the above-described embodiment illustrate the blocks of functional units. These functional blocks (constituent units) are realized by arbitrary combination of hardware and/or software. In addition, means for implementing each functional block is not particularly limited. Namely, each functional block may be realized by one physically and/or logically combined device.

Alternatively, two or more physically and/or logically separated devices may be directly and/or indirectly connected (for example, in a wired and/or wireless manner), and thus, each functional block may be realized by these plural devices.

Figure 16:
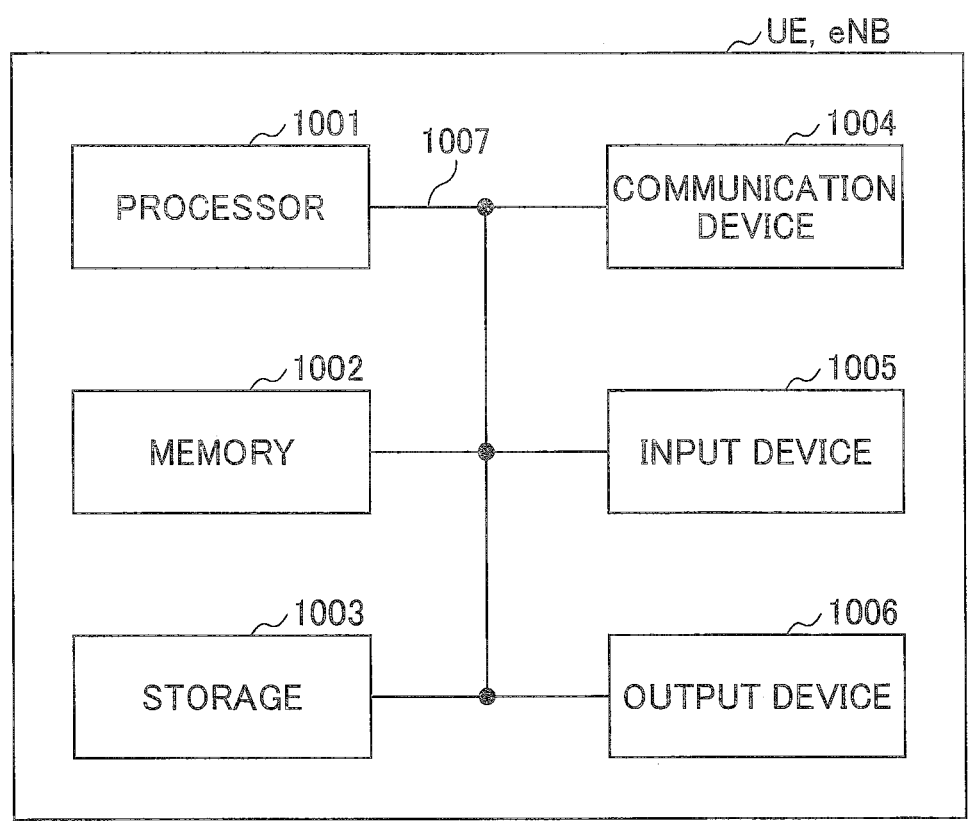
FIG. 16 is a diagram illustrating a hardware configuration example of a user equipment and a base station according to each embodiment.

For example, the base station eNB and the user equipment UE according to an embodiment of the present invention may function as a computer that performs processing of the signal transmission method according to the present invention. FIG. 16 is a diagram illustrating a hardware configuration example of the user equipment and the base station according to the embodiment. The above-described base station eNB and user equipment UE may be physically configured as a computer device including a processor 1001, a memory 1002, a storage 1003, a communication device 1004, an input device 1005, an output device 1006, a bus 1007, and the like.

In addition, in the following description, the term "device" can be replaced with a circuit, a device, a unit, or the like. The hardware configuration of the base station eNB and the user equipment UE may be configured to include one or a plurality of the respective devices illustrated in the drawings or may be configured not to include some devices.

Each function of the base station eNB and the user equipment UE is realized by allowing the processor 1001 to perform a calculation by allowing predetermined software (programs) to be loaded on hardware such as the processor 1001 and the memory 1002 and controlling communication by the communication device 1004 and reading and/or writing of data in the memory 1002 and the storage 1003.

The processor 1001 operates, for example, the operating system to control the whole computer. The processor 1001 may be configured with a central processing unit (CPU) including an interface with a peripheral device, a control device, an arithmetic device, a register and the like. For example, the signal transmission unit 101, the signal reception unit 102, the RRC processing unit 103, and the MAC processing unit 104 of the user equipment UE and the signal transmission unit 201, the signal reception unit 202, the RRC processing unit 203, the setting unit 2031, and control unit 2032 of the base station eNB may be realized by the processor 1001.

In addition, the processor 1001 reads a program (program code), a software module, or data from the storage 1003 and/or the communication device 1004 to the memory 1002 and executes various types of processing according to the program and the like. As the program, a program that allows a computer to execute at least a portion of the operation described in the above-described embodiment is used. For example, the signal transmission unit 101, the signal reception unit 102, the RRC processing unit 103, the MAC processing unit 104 of the user equipment UE and the signal transmission unit 201, the signal reception unit 202, the RRC processing unit 203, the setting unit 2031, and the control unit 2032 of the base station eNB may be realized by a control program that is stored in the memory 1002 and operates through the processor 1001, and other functional blocks may also be realized in the same manner. Although it has been described that the above-described various types of processing are executed by one processor 1001, the various types of processing may be executed simultaneously or sequentially by two or more processors 1001. The processor 1001 may be implemented with one or more chips. In addition, the program may be transmitted from the network via an electric communication line.

The memory 1002 is a computer-readable recording medium and is configured with, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (main storage device), or the like. The memory 1002 can store executable programs (program codes), software modules, and the like for implementing the signal transmission method according to an embodiment of the present invention.

The storage 1003 is a computer-readable recording medium, and may be configured to include, for example, at least one of an optical disk such as a compact disc ROM (CD-ROM), a hard disk drive, a flexible disk, a magneto-optical disk (for example, a compact disk, a digital versatile disk, a Blu-ray (registered trademark) disk, or the like), a smart card, a flash memory (for example, a card, a stick, a key drive, or the like), a floppy (registered trademark) disk, a magnetic strip, and the like. The storage 1003 may be referred to as an auxiliary storage device. The above-described storage medium may be, for example, a database including the memory 1002 and/or the storage 1003, a server, or other appropriate medium.

The communication device 1004 is hardware (transmission/reception device) for performing communication between computers via a wired and/or wireless network and is also referred to as a network device, a network controller, a network card, a communication module, or the like. For example, the signal transmission unit 101 and the signal reception unit 102 of the user equipment UE and the signal transmission unit 201 and the signal reception unit 202 of the base station eNB may be realized by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. In addition, the input device 1005 and the output device 1006 may be configured to be integrated (for example, a touch panel).

In addition, the respective devices such as the processor 1001 and the memory 1002 are connected via the bus 1007 for communicating information. The bus 1007 may be configured as a single bus or may be configured as different buses between the devices.

In addition, the base station eNB and the user equipment UE may be be configured to include hardware such as a microprocessor, a digital signal processor (DSP), an application specific integrated circuit (ASIC), a programmable logic device (PLD), and a field programmable gate array (FPDA) and may be realized by some or all of the functional blocks. For example, the processor 1001 may be implemented with at least one of the above hardware.

SUMMARY

As described above, according to an embodiment, there is provided a user equipment in a wireless communication system including a base station and the user equipment, including: a reception unit configured to receive information for setting a value of a predetermined timer from the base station; and a transmission unit configured to transmit an uplink data in a case where the timer is not activated, in which the transmission unit activates the predetermined timer in a case where the value of the predetermined timer is set from the base station and information indicating that there is no uplink data to be transmitted is transmitted to the base station. According to the user equipment UE, provided is a technique capable of suppressing an increase in signaling amount in the wireless communication system.

In addition, according to an embodiment, there is provided a user equipment in a wireless communication system including a base station and the user equipment, including: a reception unit configured to receive information for setting a value of a predetermined timer from the base station; and a transmission unit configured to transmit an uplink data, in which the transmission unit activates the predetermined timer in a case where the predetermined timer value is set from the base station and information indicating that there is no uplink data to be transmitted is transmitted to the base station, and the transmission unit does not transmit the information indicating that there is no uplink data to be transmitted to the base station until the predetermined timer expires. According to the user equipment UE, provided is a technique capable of suppressing an increase in signaling amount in the wireless communication system.

In addition, the information for setting the value of the predetermined timer may be included in an information element indicating the MAC layer setting.

In addition, the information for setting the value of the predetermined timer may be included in an information element indicating the MAC layer setting for the user equipment corresponding to the narrow band. By doing so, only the user equipment UE corresponding to the narrow band can be allowed to execute the operation described in the embodiment.

In addition, according to an embodiment, there is provided a base station in a wireless communication system including the base station and a user equipment, including: a setting unit configured to set predetermined information to the user equipment; and a control unit configured to release RRC connection with the user equipment in the case of setting the predetermined information to the user equipment and in the case of receiving information indicating that there is no uplink data to be transmitted from the user equipment. According to the base station eNB, provided is a technique capable of suppressing an increase in signaling amount in the wireless communication system.

In addition, according to an embodiment, there is provided a signal transmission method executed by a user equipment in a wireless communication system including a base station and the user equipment, the method including steps of: receiving information for setting a value of a predetermined timer from the base station; transmitting an uplink data in a case where the predetermined timer is not activated; and activating the predetermined timer in a case where the value of the predetermined timer is set from the base station and information indicating that there is no uplink data to be transmitted is transmitted to the base station. According to the signal transmission method, provided is a technique capable of suppressing an increase in signaling amount in the wireless communication system.

In addition, according to an embodiment, there is provided a signal transmission method executed by a user equipment in a wireless communication system including a base station and the user equipment, the method including steps of: receiving information for setting a value of a predetermined timer from the base station; transmitting uplink data; activating the predetermined timer in a case where the value of the predetermined timer is set from the base station and information indicating that there is no uplink data to be transmitted is transmitted to the base station; and not transmitting the information indicating that there is no uplink data to be transmitted to the base station until the predetermined timer expires. According to the signal transmission method, provided is a technique capable of suppressing an increase in signaling amount in the wireless communication system.

Supplement to Embodiments

Notification of information is not limited to the aspects and embodiments described in the specification, but the notification of information may be performed in other methods. For example, the notification of information may be performed by physical layer signaling (for example, downlink control information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. In addition, the RRC signaling may be referred to as an RRC message, for example, an RRC connection setup message, an RRC connection reconfiguration message, or the like.

Each aspect/embodiment described in the specification can be applied to long term evolution (LTC), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

In addition, processing procedures, sequences, flowcharts, and the like of each aspect and embodiment described in the specification may be exchanged as long as there is no inconsistency. For example, for the methods described in the specification, the elements of the various steps are presented in an exemplary order and are not limited to a specific order presented.

In some cases, the specific operations performed by the base station in the specification may be performed by upper nodes. It is apparent that, in a network configured with one or more network nodes having a base station, various operations performed for communication with a terminal may be performed by the base station and/or other network nodes other than the base station (for example, MME, S-GW, or the like is considered, but not limited thereto). In the above description, the case where there is one network node other than the base station is described as an example, but a combination of a plurality of other network nodes (for example, MME and S-GW) may be used.

Input/output information or the like may be stored in a specific site (for example, a memory) or may be managed in a management table. The input/output Information or the like may be overwritten, updated, or additionally written. The output information or the like may be deleted. The input information or the like may be transmitted to another device.

In some cases, the user equipment UE may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term by the skilled in the art.

The phrase "based on" used in the specification does not denote "based only on" unless explicitly stated otherwise. In other words, the phrase "based on" denotes both "based only on" and "based at least on".

Each aspect and embodiment described in the specification may be used alone, may be used in combination thereof, or may be used by being exchanged according to the execution. In addition, notification of predetermined information (for example, notification of "being X") is not limited to being performed explicitly, but the notification may be performed implicitly (for example, not notifying the predetermined information).

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

Although the present invention has been described above in detail, it will be apparent to the skilled in the art that the present invention is not limited to the embodiments described herein. The present invention can be implemented as changes and modifications without departing from the spirit and scope of the present invention as defined by the scope of the claims. Accordingly, the description of the specification is provided for the purpose of illustration and description and does not have any restrictive meaning with respect to the present invention.

In the embodiment, the signal transmission unit 101, the RRC processing unit 103, and the MAC processing unit 104 are examples of a transmission unit. In addition, the signal reception unit 102 and the RRC processing unit 103 are examples of the reception unit. A "timer for prohibiting transmission of an UL data for a predetermined period" or a "timer for prohibiting notification that there is no UL data to be transmitted for a predetermined period" is an example of a predetermined timer. A "timer for prohibiting transmission of an UL data for a predetermined period", a "timer for prohibiting notification that there is no UL data to be transmitted for a predetermined period", or "operation setting information" is an example of predetermined information.

The present application is based on and claims priority to Japanese patent application No. 2016-101953 filed on May 20, 2016, and Japanese patent application No. 2016-105567 filed on May 26, 2016, the entire contents of which are hereby incorporated by reference.

EXPLANATIONS OF LETTERS OR NUMERALS

UE user equipment
eNB base station
101 signal transmission unit
102 signal reception unit
103 RRC processing unit
104 MAC processing unit
201 signal transmission unit
202 signal reception unit
203 RRC processing unit
2031 setting unit
2032 control unit
1001 processor
1002 memory
1003 storage
1004 communication device
1005 input device
1006 output device

The invention claimed is:

1. A terminal of a radio communication system including a base station and the terminal, the terminal comprising:
a receiver that receives, from the base station, information to configure a value for a predetermined timer; and
a transmitter that performs an uplink data transmission,
wherein, if the value for the predetermined timer is configured by the base station, and if information to notify that there is no uplink data to be transmitted is transmitted to the base station, the transmitter starts the predetermined timer, and
the transmitter transmits, to the base station, the information to notify that there is no uplink data to be transmitted after the predetermined timer expires, and
wherein the information to configure the value for the predetermined timer is included in an information element indicating a MAC layer configuration, the information element being a MAC-MainConfigNB information element.

2. The terminal according to claim 1, wherein the information to configure the value for the predetermined timer is included in an information element indicating a MAC layer configuration.

3. A radio communication system comprising:
a base station; and
a terminal,
wherein the base station includes
a transmitter that transmits information to configure a value for a predetermined timer, and
wherein the terminal includes
a receiver that receives, from the base station, the information to configure the value for the predetermined timer, and
a transmitter that performs an uplink data transmission,
wherein, if the value for the predetermined timer is configured by the base station, and if information to notify that there is no uplink data to be transmitted is transmitted to the base station, the transmitter of the terminal starts the predetermined timer, and the transmitter of the terminal transmits, to the base station, the information to notify that there is no uplink data to be transmitted after the predetermined timer expires, and
wherein the information to configure the value for the predetermined timer is included in an information element indicating a MAC layer configuration, the information element being a MAC-MainConfigNB information element.

4. A signal transmission method executed by a terminal of a radio communication system including a base station and the terminal, the method comprising:
receiving, from the base station, the information to configure a value for a predetermined timer, and
performing an uplink data transmission,
wherein, if the value for the predetermined timer is configured by the base station, and if information to notify that there is no uplink data to be transmitted is transmitted to the base station, starting the predetermined timer, and transmitting, to the base station, the information to notify that there is no uplink data to be transmitted after the predetermined timer expires, and
wherein the information to configure the value for the predetermined timer is included in an information element indicating a MAC layer configuration, the information element being a MAC-MainConfigNB information element.

* * * * *